United States Patent
Casper et al.

(10) Patent No.: US 10,182,485 B2
(45) Date of Patent: Jan. 15, 2019

(54) LENS STRUCTURE FOR HIGH INTENSITY LED FIXTURE

(71) Applicant: Eaton Intelligent Power Limited, Dublin (IE)

(72) Inventors: Joseph R. Casper, Syracuse, NY (US); Christopher D. Nolan, Syracuse, NY (US); Joseph J. Witkowski, Syracuse, NY (US); Jeff R. Shuster, Syracuse, NY (US); Brian M. Wilson, Syracuse, NY (US)

(73) Assignee: Eaton Intelligent Power Limited, Dublin (IE)

( * ) Notice: Subject to any disclaimer, the term of this patent is extended or adjusted under 35 U.S.C. 154(b) by 308 days.

(21) Appl. No.: 14/573,668

(22) Filed: Dec. 17, 2014

(65) Prior Publication Data

US 2015/0167922 A1    Jun. 18, 2015

Related U.S. Application Data

(60) Provisional application No. 61/917,030, filed on Dec. 17, 2013.

(51) Int. Cl.

| | |
|---|---|
| *F21V 5/00* | (2018.01) |
| *F21V 29/50* | (2015.01) |
| *F21V 23/02* | (2006.01) |
| *F21V 29/507* | (2015.01) |
| *F21V 3/00* | (2015.01) |
| *F21V 23/00* | (2015.01) |
| *G02B 27/30* | (2006.01) |

(Continued)

(52) U.S. Cl.
CPC ........... *H05B 33/089* (2013.01); *F21V 5/007* (2013.01); *F21V 15/012* (2013.01); *F21V 23/02* (2013.01); *F21V 29/50* (2015.01); *F21V 29/507* (2015.01); *H05B 33/0845* (2013.01); *H05B 33/0848* (2013.01); *H05B 33/0851* (2013.01); *H05B 33/0854* (2013.01); *H05B 33/0857* (2013.01); *H05B 33/0869* (2013.01); *H05B 33/0872* (2013.01); *H05B 37/0218* (2013.01); *H05B 37/0227* (2013.01); *F21V 3/00* (2013.01); *F21V 5/04* (2013.01); *F21V 21/30* (2013.01); *F21V 23/004* (2013.01); *F21V 23/006* (2013.01); *F21W 2102/00* (2018.01); *F21W 2107/10* (2018.01); *F21W 2131/105* (2013.01); *F21W 2131/406* (2013.01); *F21Y 2105/10* (2016.08); *F21Y 2115/10* (2016.08); *G02B 27/30* (2013.01)

(58) Field of Classification Search
CPC ......... F21V 5/007; F21V 7/0083; F21V 13/04
USPC ........................... 362/311.02, 368, 331, 268
See application file for complete search history.

(56) References Cited

U.S. PATENT DOCUMENTS 2,254,962 A * 9/1941 Bitner et al. .................. 362/327
6,367,950 B1 * 4/2002 Yamada et al. ............... 362/245
(Continued)

FOREIGN PATENT DOCUMENTS

EP            1048085         11/2000

*Primary Examiner* — William N Harris
(74) *Attorney, Agent, or Firm* — Fox Rothschild LLP (57) ABSTRACT

A lens structure for a light emitting diode (LED) lighting fixture includes one or more lenses, each of which is configured to be located over an LEDs of the lighting fixture. Each lens includes a bowl-shaped collimator, an air gap positioned over the dome and extending into a first end of the collimator, and a core positioned over the air gap and extending into an opposing second end of the collimator.

18 Claims, 9 Drawing Sheets

(51) Int. Cl.

| | | |
|---|---|---|
| *F21V 5/04* | (2006.01) | |
| *F21Y 105/10* | (2016.01) | |
| *F21Y 115/10* | (2016.01) | |
| *H05B 33/08* | (2006.01) | |
| *H05B 37/02* | (2006.01) | |
| *F21V 15/01* | (2006.01) | |
| *F21V 15/02* | (2006.01) | |
| *F21W 131/406* | (2006.01) | |
| *F21V 21/30* | (2006.01) | |
| *F21W 131/105* | (2006.01) | |
| *F21W 107/10* | (2018.01) | |
| *F21W 102/00* | (2018.01) | |

(56) References Cited

U.S. PATENT DOCUMENTS

| | | |
|---|---|---|
| 6,547,423 B2 | 4/2003 | Marshall et al. |
| 6,724,543 B1 * | 4/2004 | Chinniah et al. ............ 359/718 |
| D495,821 S | 9/2004 | Huang |
| 6,962,423 B2 | 11/2005 | Hamilton et al. |
| 7,202,613 B2 | 4/2007 | Morgan et al. |
| D636,926 S | 4/2011 | You |
| D648,886 S | 11/2011 | Kong et al. |
| 8,274,220 B2 | 9/2012 | Destain et al. |
| D679,446 S | 4/2013 | Harrington, Jr. |
| 8,591,083 B2 * | 11/2013 | Koizumi et al. ............. 362/522 |
| D714,991 S | 10/2014 | Norris et al. |
| 9,307,621 B1 | 4/2016 | Parello et al. |
| D757,992 S | 5/2016 | Hsu |
| D774,688 S | 12/2016 | Dennis et al. |
| D775,407 S | 12/2016 | Datz et al. |
| 2005/0179041 A1 | 8/2005 | Harbers et al. |
| 2006/0164836 A1 | 7/2006 | Suehiro et al. |
| 2009/0040470 A1 | 2/2009 | Fukui et al. |
| 2009/0067172 A1 | 3/2009 | Inoue et al. |
| 2009/0251897 A1 * | 10/2009 | Kabuki ............... G02B 6/0018 362/235 |
| 2012/0033419 A1 | 2/2012 | Kim et al. |
| 2012/0087118 A1 | 4/2012 | Bailey et al. |
| 2012/0182743 A1 * | 7/2012 | Chou ............................ 362/351 |
| 2013/0003360 A1 | 1/2013 | Igaki et al. |
| 2013/0033881 A1 | 2/2013 | Terazawa et al. |
| 2013/0077307 A1 | 3/2013 | Yamamoto |
| 2013/0235581 A1 * | 9/2013 | Iatan ............... B29D 11/00298 362/238 |
| 2014/0028200 A1 | 1/2014 | Van Wagoner et al. |
| 2014/0184066 A1 | 7/2014 | Teramoto et al. |
| 2014/0265845 A1 | 9/2014 | Williams |
| 2015/0054410 A1 | 2/2015 | Sanders et al. |
| 2015/0061506 A1 | 3/2015 | Baaijens et al. |
| 2015/0076992 A1 | 3/2015 | Walma |

* cited by examiner

LENS STRUCTURE FOR HIGH INTENSITY LED FIXTURE

RELATED APPLICATIONS AND CLAIM OF PRIORITY

This patent document claims priority to U.S. Provisional Patent Application No. 61/917,030, filed Dec. 17, 2013, the disclosure of which is fully incorporated into this document by reference.

The patent document is related to U.S. patent application Ser. No. 14/573,521; U.S. patent application Ser. No. 14/573,553; U.S. patent application Ser. No. 14/573,584; and U.S. patent application Ser. No. 14/573,619, each filed Dec. 17, 2014. The disclosures of each related application are fully incorporated into this document by reference.

BACKGROUND

Entertainment facilities such as stadiums, arenas and concert halls seek ways to offer unique experiences with lighting and special effects. This document describes new illumination devices that can be especially useful in such applications, and lenses for such devices.

SUMMARY

In an embodiment, a lens for a light emitting diode (LED) lighting fixture includes a collimator having a first end positioned and an opposing second end having a width that is wider than a width of the first end. An air gap is positioned at the first end, wherein the air gap comprises an opening that is symmetrically positioned around a central axis. The collimator also includes a core that is configured to have a central axis that is positioned along the central axis of the air gap, wherein the core includes an open end positioned at the second end of the collimator.

A group of the lenses may be connected by a connecting structure to form a lens cover, and the lens cover may be connected to an LED lighting fixture having a set of LEDs. The connecting structure may be connected to an upper section of each lens near the lens' widest section, such as a rim of each lens. One or more sidewalls may extend from a support of the connecting structure, and a lower rim may be connected to a lower end of any of the sidewalls and configured to be received by the LED lighting fixture. The lens cover also may include an area that does not include lenses and that is configured to cover a circuit board.

The air gap of each lens may include an opening and a concave sidewall that extends into the collimator to form a dome shape. Each core may include a closed end that is opposite the open end and which also has a dome shape, wherein the apex of the dome extends into the core. Optionally, the dome shape of the closed end of the core may have a radius of curvature that is substantially the same as that of the concave sidewall of the air gap.

In some embodiments, each collimator may be made of a polycarbonate material, each collimator may include a sidewall that provides a bowl shape, and/or each core may include a hollow cylinder that is open to receive ambient air.

Optionally, the dimensions of the lens may be such that if its corresponding LED has a width of X, then: (i) a distance between a first end and the apex of the air gap is about 1.48X to about 1.54X; (ii) a diameter of the core is about 1.48X to about 1.54X; (iii) a height of the core is about 2.15X to about 2.4X; and (iv) a diameter of the second end is about 4.2X to about 4.4X. In addition, each lens may be configured to provide a beam angle of about 10.3° and a field angle of about 18.2°. Other dimensions and angles are possible.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

When used in this document, the terms "upper" and "lower," as well as "vertical" and "horizontal," are not intended to have absolute orientations but are instead intended to describe relative positions of various components with respect to each other. For example, a first component may be an "upper" component and a second component may be a "lower" component when a light fixture is oriented in a first direction. The relative orientations of the components may be reversed, or the components may be on the same plane, if the orientation of a light fixture that contains the components is changed. The claims are intended to include all orientations of a device containing such components.

Figure 1:
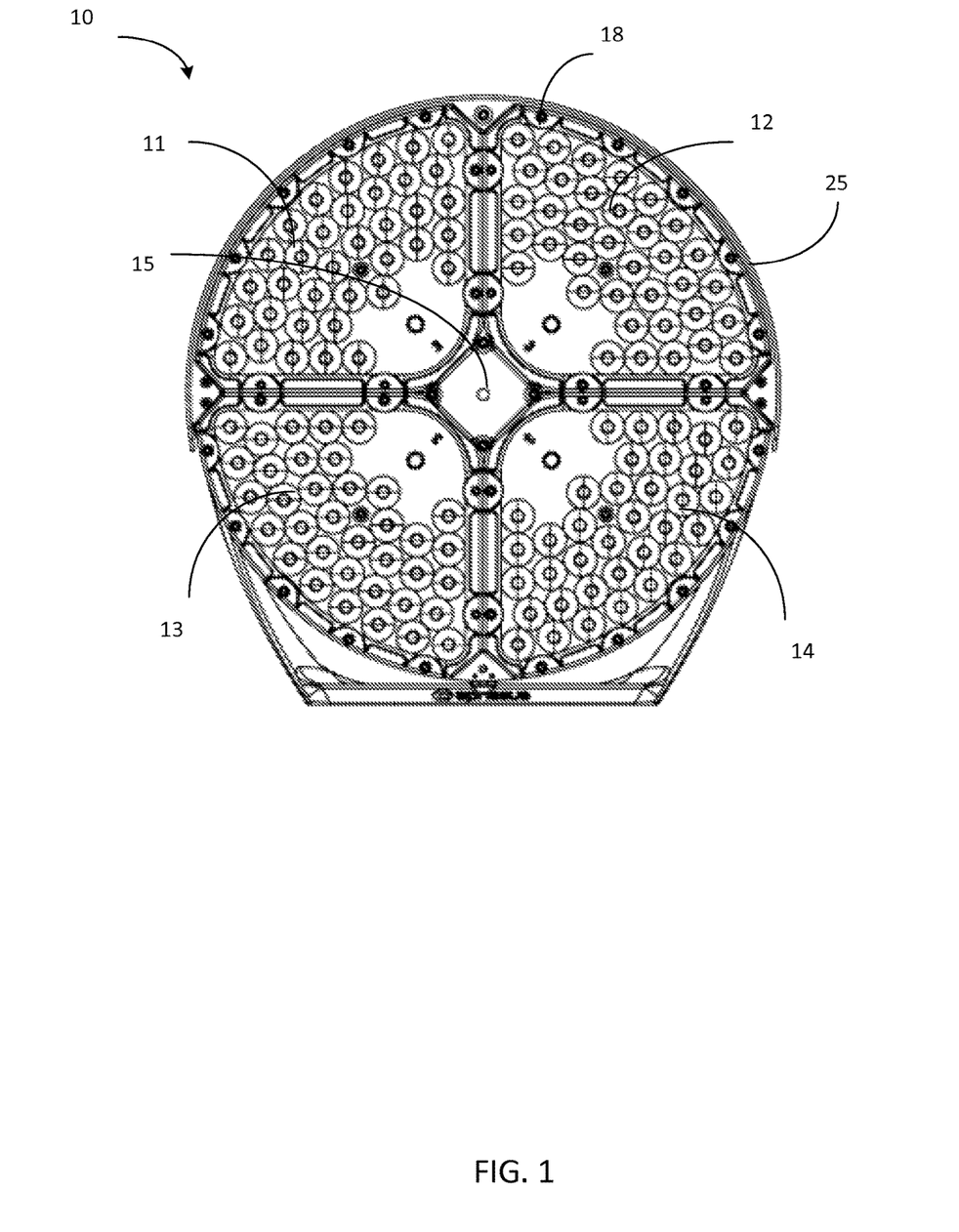
FIG. 1 illustrates a front view of an example of an illumination device.
Figure 2:
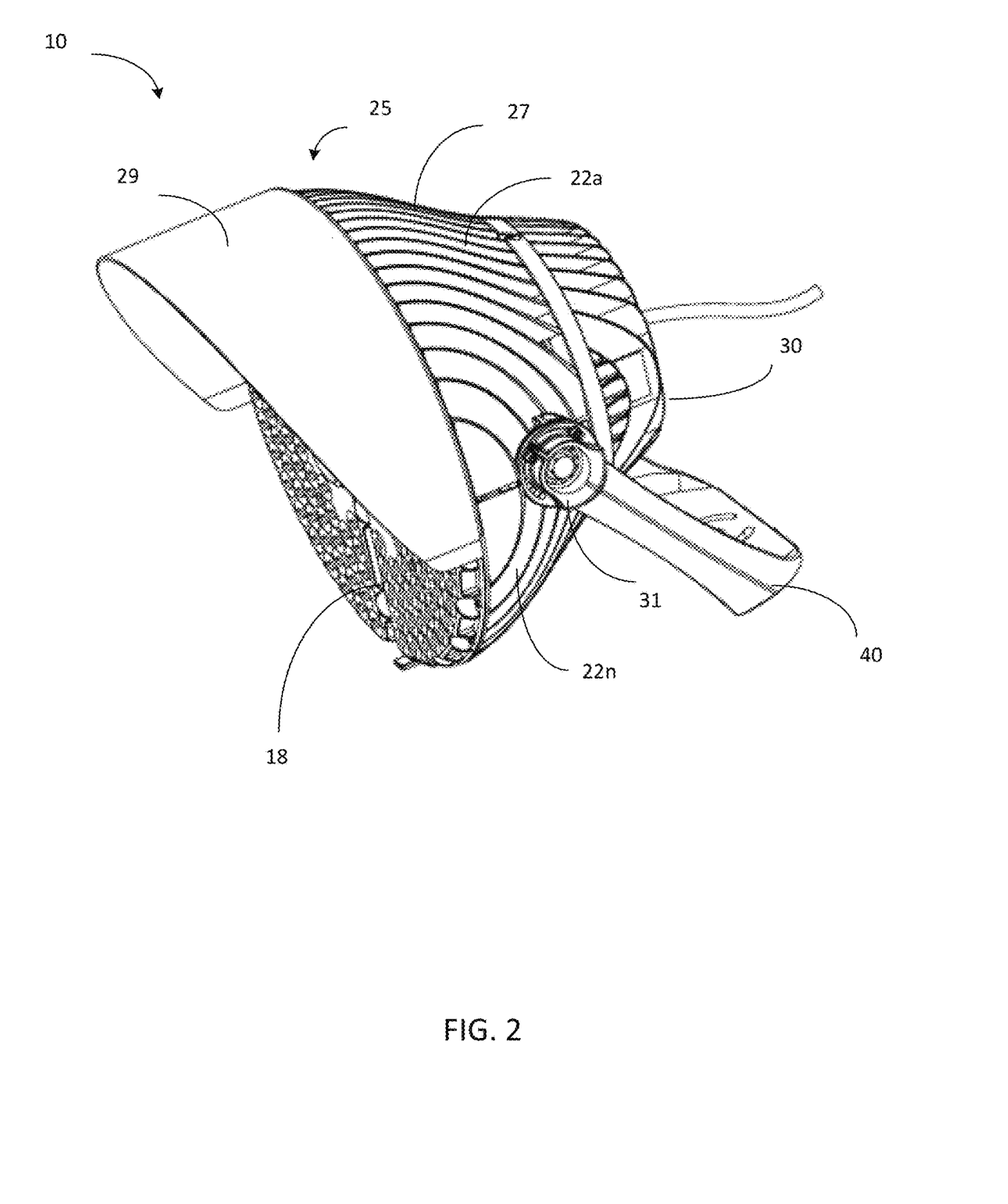
FIG. 2 illustrates a perspective view from a first side of the device of FIG. 1.
Figure 3:
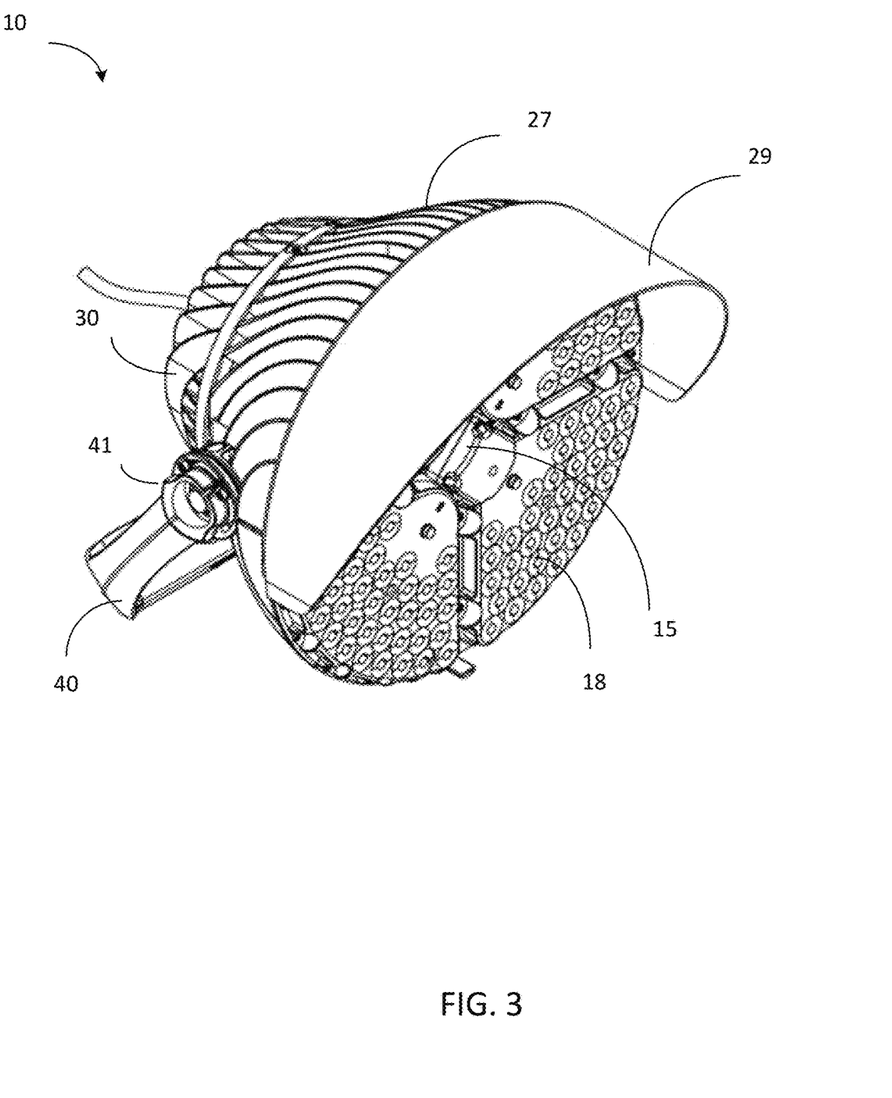
FIG. 3 illustrates a perspective view from a second side of the device of FIG. 1.

FIG. 1 illustrates a front view of an example of one embodiment of an LED illumination device. FIG. 2 illustrates a perspective view from one side of the device of FIG. 1, while FIG. 3 illustrates a perspective view from the opposite side of the device of FIG. 1. These light fixtures represent examples of LED illumination devices that may be used with the lens structures described in this document; other light fixtures also may be used with the lenses. The illumination device 10 includes a housing 25 that encases various components of a light fixture. The housing 25 includes an opening in which a set of light emitting diode (LED) modules 11-14 are secured to form a multi-module LED structure 18. The LED modules 11-14 are positioned to emit light away from the fixture. Each LED module includes a frame that holds a set of LEDs arranged in an array or other configuration, and in various embodiments the set of LEDs may be of a number that is sufficient to provide a high intensity LED device. The opening also provides an open section 15 via which one or more sensors may detect information about the environment exterior to the device. The sensors may include sensors that are configured to detect light intensity, ambient air temperature, color temperature, color rendering index, $D_{uv}$ or other properties of the ambient area in front of the LED modules 11-14.

The opening of the housing 25 may be circular as shown, with the open section 15 for the sensors positioned at the center of the circle and the LED modules 11-14 positioned around the central open section to form a ring-shaped overall LED structure, although other shapes and configurations are possible. The LED modules 11-14 may include four modules, each of which is positioned in a quadrant of the circle as shown. Alternatively, any other number of LED modules, such as one, two, three, five or more LED modules, may be positioned within the opening in any configuration.

The device's housing 25 includes a body portion 27 and an optional shroud portion 29. The body portion 27 serves as a heat sink that dissipates heat that is generated by the LED modules. The body/heat sink 27 may be formed of aluminum and/or other metal, plastic or other material, and it may include any number of fins 22a . . . 22n on the exterior to increase its surface area that will contact a surrounding cooling medium (typically, air). Thus, the body portion 27 may have a bowl shape (i.e., semi-hemispherical) as shown, the LED structure 18 may fit within the opening of the bowl, and heat from the LED modules 11-14 may be drawn away from the LED structure and dissipated via the fins 22a . . . 22n on the exterior of the bowl.

The body 27 may be formed as a single piece, or it may be formed of two pieces that fit together as in a clamshell-type structure as shown. In a clamshell design, a portion of the interior wall of the clamshell near its opening may include a groove, ridge, or other supporting structure that is configured to receive and secure the LED structure in the opening when the clamshell is closed. In addition, the fins 22a . . . 22n may be curved or arced as shown, with the base of each fin's curve/arc positioned proximate the opening/LED modules, and the apex of each fin's curve/arc positioned distal from the opening/LED modules to further help draw heat away from the LED modules.

Typically, any openings of the housing 25 will be sealed with a weatherproofing material such as rubber or silicone. In addition, the housing may include a shroud 29 that extends from the body 27 and beyond the LED modules. The shroud may be semi-circular in shape when the multi-module LED structure is circular, and it may be angled or shaped to shield an upper portion of the light assembly from rain while directing, focusing and/or reflecting light so that the light is concentrated in a desired direction (e.g., downward). In this way, the housing 25 may provide a dust-resistant and water-resistant housing that protects electronic components of the illumination device. This may be sufficient to meet the standards required to provide a National Electrical Manufacturers Association (NEMA) type 1 or type 2 enclosure. For outdoor installations, the housing may sealed to provide a NEMA type 3 enclosure. The shroud 29 may have a variable width so that an upper portion positioned at the top of LED structure 18 is wider than a lower portion positioned at the bottom and/or along the sides of the LED structure. This helps to reduce the amount of light wasted to the atmosphere by reflecting and redirecting stray light downward to the intended illumination surface.

While the LED structure is positioned at one side of the body 27, the opposing side of the body may include a power supply 30. The power supply 30 may include a battery, solar panel, or circuitry to receive power from an external and/or other internal source. As shown, the external housing of the power supply 30 also may include fins to help dissipate heat from the power supply. The fins of the power supply may have a longest dimension that extends away from the LED structure (i.e., perpendicular to the widest dimension of the LED structure) to help with heat dissipation. Power wiring may be positioned within the body 27 to convey energy from the power supply 30 to the LED array modules 11-14. The power supply 30 may extend from the rear of the housing as shown, or it may be placed into the housing so that it is flush or substantially flush with the rear of the housing 25, or it may be configured to extend to some point between being flush with the housing 25 and the extended position of the configuration shown in FIG. 2.

The housing may be attached to a support structure 40, such as a base or mounting yoke, optionally by one or more connectors 31. As shown, the connectors 31 may include axles about which the housing and/or support structure may be rotated to enable the light assembly to be positioned to direct light at a desired angle. The housing 27 may be formed of two or more molded sections 27a, 27b that fit together as a clamshell-type structure. Each section 27a, 27b may include one or more pins, receptacles, clips, or other receiving structures that help align and/or secure the sections together when positioned in place and connected to the shroud and/or power supply receptacle (shown in other Figures). The two sections 27a, 27b form a cavity 29 within the body when connected.

Figure 4:
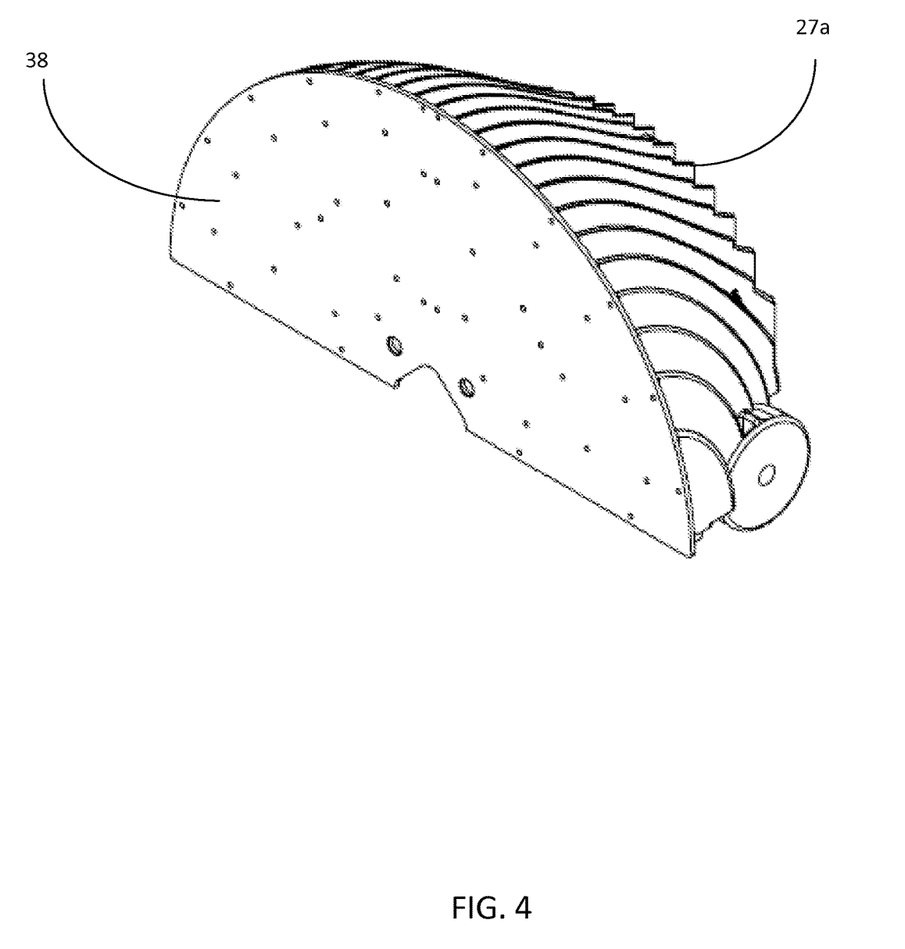
FIG. 4 illustrates how a body portion of the device of FIG. 1 may receive a portion of a light emitting diode (LED) structure.

FIG. 4 illustrates that each housing section 27a may form part of the opening in which the LED structure resides. Each LED module of the LED structure may include one or more conducting substrates 38 that serve to hold the LEDs in place and provide a cooling path to the LEDs. The substrates may be made of any support material (such as fiberglass or aluminum) with conductive elements (such as traces, bars or wires) placed thereon or therein to direct power to the LEDs. FIG. 4 also illustrates an embodiment in which two LED modules form the LED structure, and each LED module is configured in a half-circle configuration. Thus, with a circular opening, the LED modules may be semi-circular in shape so that two, three, four or more of them together form a circle that fits within the opening.

Figure 5:
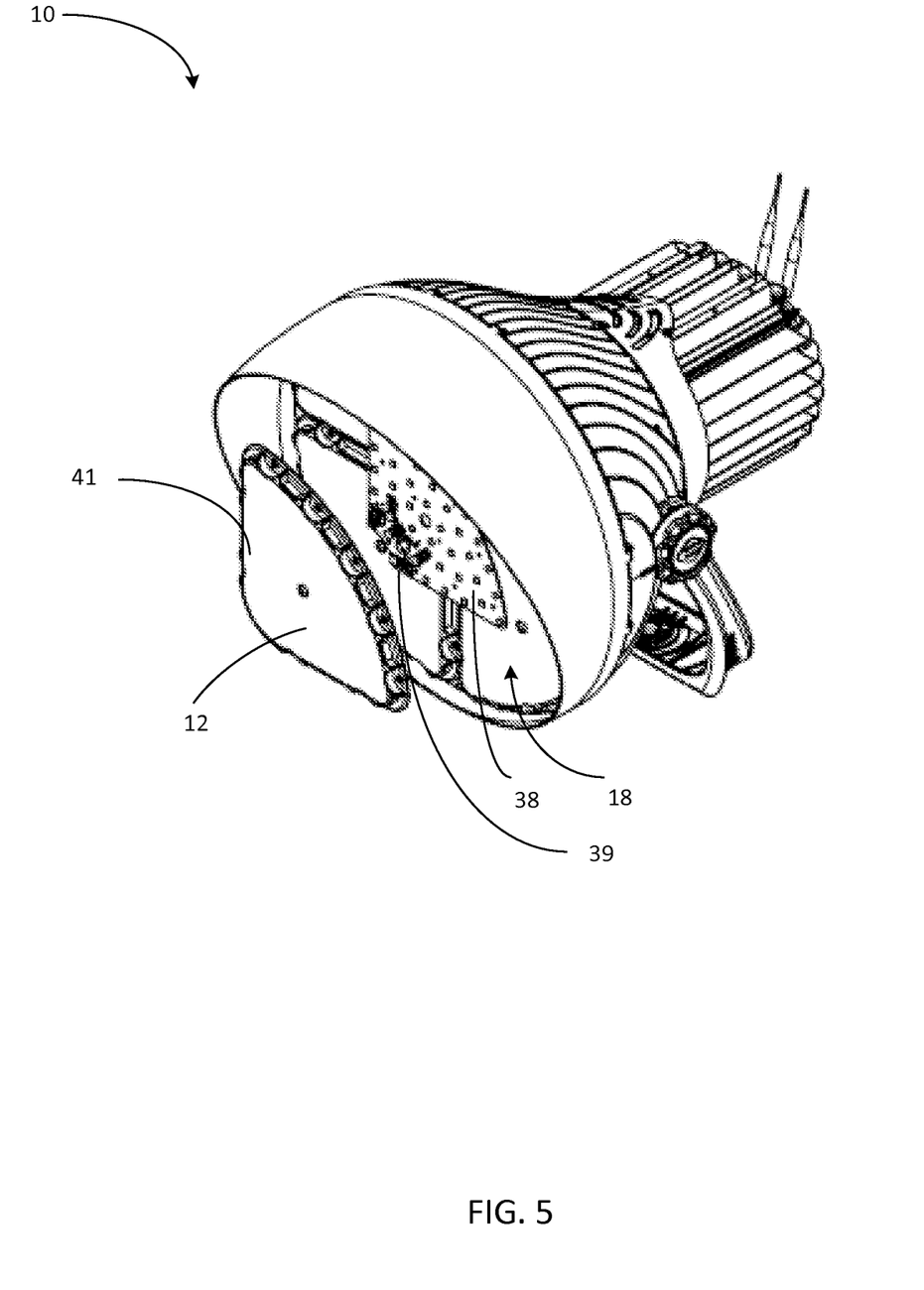
FIG. 5 illustrates an embodiment of the device with an expanded view of an LED module.

FIG. 5 illustrates an embodiment of the device, with an expanded view of one of the LED modules 12 of the LED structure 18. As shown, the LED module 12 includes a conductive substrate 38 on which a number of LEDs 39 are positioned. The LEDs 39 may be arranged in one or more rows, matrices, or other arrangements with corresponding components supported in place and/or spaced apart by supports. For example, the LEDs may form matrices of n×n LEDs, such as 4×4 or 8×8 matrices. Alternatively, as shown in FIG. 5, the LEDs in each module 12 may be positioned in curved rows so that when all modules are positioned within the opening, the LED structure 18 comprises concentric rings of LEDs. The grouping of LEDs for the purpose of power supply and control may or may not conform to the arrangement of the LEDs in rings, clusters, matrices or other groupings. The substrate 38 may include a portion that is a printed circuit board. Driver circuitry on the circuit board may deliver current to the LEDs, and the LED array modules may include multi-wire connectors with prongs and/or receptacles for connecting to external conductors and/or signal wires, or other LED array modules.

A lens cover 41 may be positioned over the substrate 38 to protect the substrate 38 and LEDs 39 from the ambient elements, as well as to focus and/or direct light emitted by the LEDs 39.

Figure 6A:
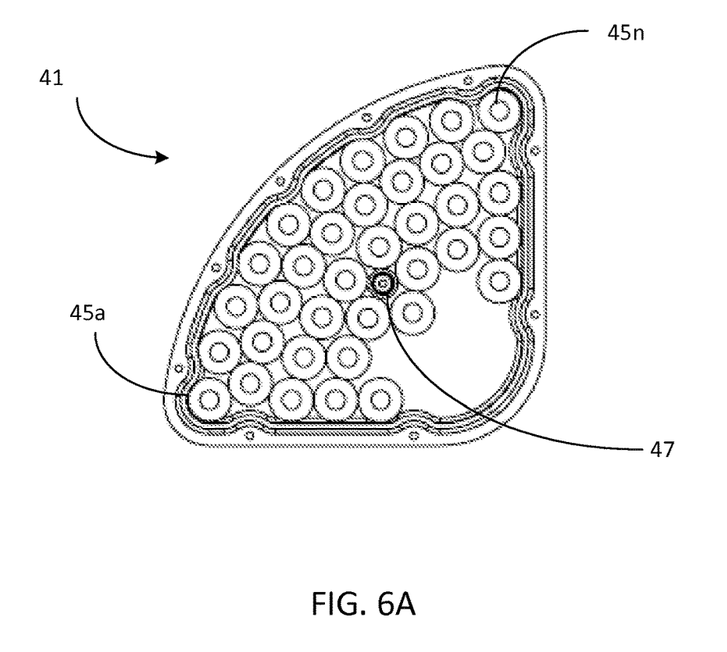
FIGS. 6A and 6B illustrate a lens cover for an LED module.
Figure 6B:
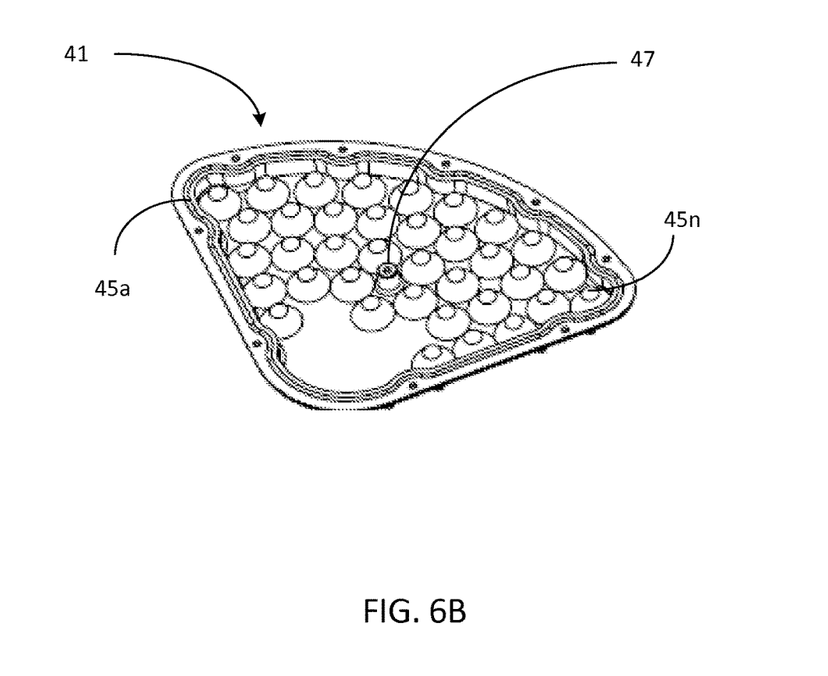

FIGS. 6A and 6B illustrate an underside of an embodiment of a lens cover 41. As shown, the lens cover 41 includes a set of lenses 45a . . . 45n, each of which is positioned to fit over an LED that has been placed on the substrate. The LEDs, and thus the lenses, may form an array. Optionally, more than one LED may share a lens. The spacing of LEDs (and thus the lenses) with respect to each other may vary based on the size of the LEDs. As shown in FIG. 6B, each lens 45a . . . 45n may be dome-shaped, with the apex of each dome being flat or concave to receive light from the corresponding LED, and the larger part of each dome being positioned on the outer side the cover to direct the light. The standoff and slope of each dome may vary depending on the desired beam angle that is to be achieved by the lighting device. For example, a lighting system may be provided with domes of at least six different shapes to correspond to various beam limiting (collimating) standards.

Figure 7:
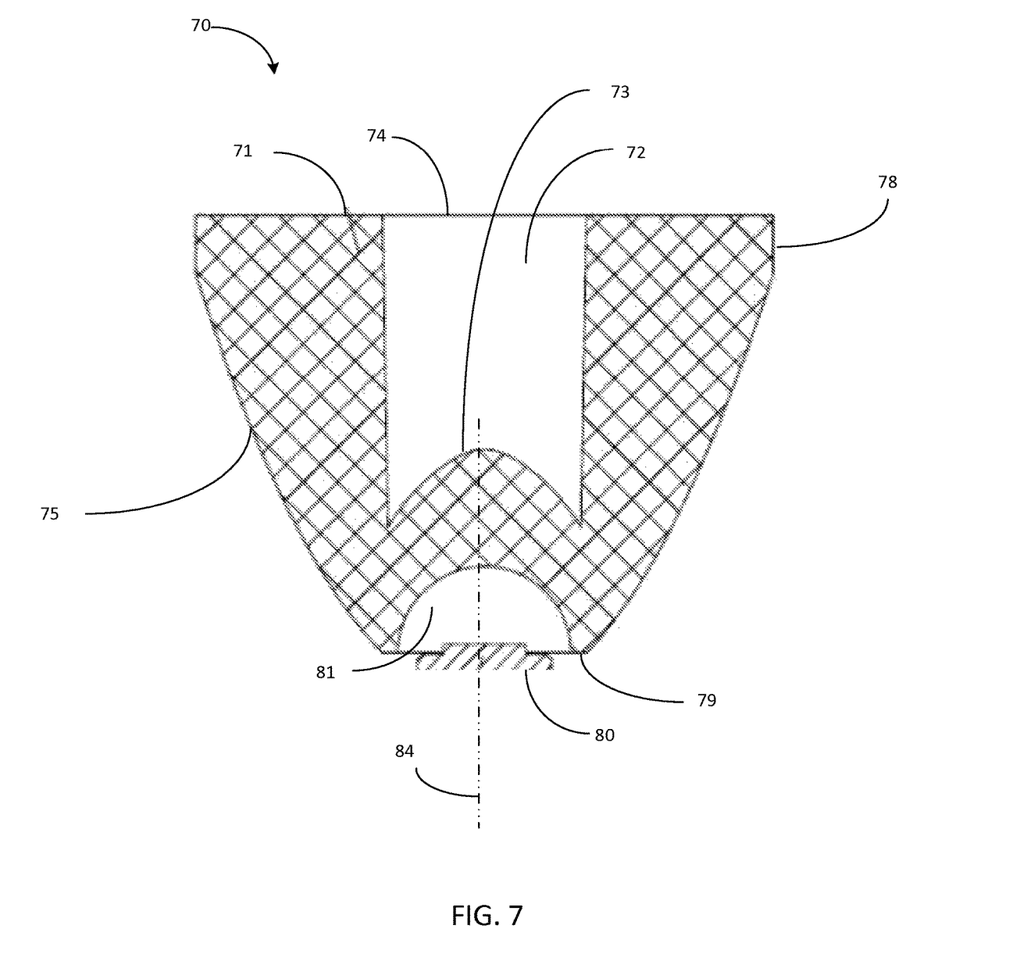
FIG. 7 illustrates an embodiment of a lens structure.

Alternatively, instead of a dome (or even in some embodiments with a dome), FIG. 7 illustrates an embodiment of a lens 70 that may be positioned in the lens cover to be located above any of the LEDs. As shown in a cross section for purposes of illustration, the LED 80 is positioned under lens 70 that includes a collimator 71 made of a polycarbonate, silicone acrylic, quartz, glass or another lens material. The collimator 71 is shaped as a bowl or cone (or upside-down dome) so that it includes a first end 79 and a surrounding sidewall 75 or sidewalls that expand the collimator to form a second end 74 that is wider than the first end 79. An undomed or domed LED 80 is positioned at the narrower first end 79. The second end includes a dome-shaped opening 81 that provides an air gap between the LED 80 and the polycarbonate, silicone, or other material of the lens structure. The dome-shaped opening 81 includes a concave sidewall that extends into the lens from the first end 79 and is symmetrically aligned along a central axis 84 of the lens.

The lens 70 also includes an empty core 72 above the dome-shaped opening 81. The core 72 may be cylindrical in shape, rectangular, or of any other configuration in which its sidewall(s) are is symmetrically aligned around the central axis 84. The core 72 includes a first end positioned along the wide end 74 of the lens to provide an opening to ambient air. The core also includes an opposing second end 73 that is dome-shaped with a radius that is substantially equal to the radius of the dome of the air gap opening 81, or there may be a slight variation as described in the next paragraph. The apex of the dome at the second end of the core 72 extends into the core 72.

The lens structure shown in FIG. 7 enables the lighting device to provide a narrow beam from each LED that is positioned under such a lens structure. For example, in an embodiment where the LED 80 has a width of X the distance between the first end 79 and the apex of the core's dome 73 may be about 1.51X, or any size from about 1.48X to about 1.54X. The diameter of the core 72 also may be about 1.51X, or any size from about 1.48X to about 1.54X. The overall height of the core 72 (from the top 74 of the lens to the lowest point of the dome 73) may be about 2.32X, or any size from about 2.15 X to about 2.4X. The overall diameter of the top 74 of the lens may be about 4.29X, or any size from about 4.2X to about 4.4X. The bowl-shape of the lens may have a radius of about 8X to about 10X, depending on the focal point selected. In one embodiment the radius of the bowl shape may be about 9.14X. The bowl may extend up to a height that is about 2.82X above the narrow first end 79, or any height that is from about 2.7X to about 2.9X. Optionally, the lens may include an upper rim 78 positioned between the curved sidewall 75 and the top 74. The sidewalls(s) of the rim 78 may have a different radius than the sidewalls 75 of the bowl, and instead of being curved may oriented to be substantially perpendicular to the width of the lens 80.

The thickness of the lens material that is located between the core's bottom dome 73 and the air gap's 81 upper dome may be substantially constant, or it may slightly vary. For example, in one embodiment the thickness of the lens material between the apex of the core's bottom dome 73 and the air gap's 81 upper dome may be approximately 0.87X, while the thickness of the lens material between the outer edges of the core's bottom dome 73 and the air gap's 81 upper dome may be approximately 0.93X. These thicknesses may vary.

This configuration may provide a beam angle of about 10.3° and a field angle of about 18.2°. Other configurations are possible depending on the desired beam angle and field angle, although in certain embodiments the angles may vary by no more than 1% from those described above. This may be substantially narrower than previous lens structures allowed, thus allowing greater control of lighting effects.

Returning to FIGS. 6A and 6B, those figures illustrate an optional area of the lens cover 41 on which no lenses appear. This may be the case of a portion of the lens cover 41 covers an area of the substrate that contains no LEDs, or in areas where no lenses are desired to be positioned over the LEDs. For example, the substrate may include a printed circuit board that provides control functions. If so, then the lens cover 41 will not need to include lenses in that area, and it may instead simply be a solid cover over those portions of the substrate. Alternatively, one or more LEDs may be equipped with no lenses so that the beam is not limited, or one or more LEDs may be equipped with a channel 47 that serves as a collimator to focus the beam of light from its associated LED. In addition, LEDs are normally manufactured with a primary lens. In some embodiments, dome lenses 45a . . . 45n may be added as secondary lens structures over the LEDs' primary lenses. In other embodiments, LEDs with no primary lens may be used, in which case the dome lenses 45a . . . 45n may serve as the only lens for one or more of the LEDs, or a lens structure such as that shown in FIG. 7 may be used. Regardless of what type of lenses 45a . . . 45n are used, the lenses may be spaced apart from each other, adjacent to each other as shown in FIGS. 6A and 6B, configured so that their bases slightly overlap, or in any combination of such positioning options. In situations where the bases overlap, a small amount of overlap may be selected to help reduce glare from the LED assembly during operation. The amount of overlap may be any suitable amount, such as approximately 2% of the base area of each dome, approximately 3% of the base area of each dome, approximately 5% of the base area of each dome, approximate 7% of the base area of each dome, approximately 10% of the base area of each dome, any range between the percentages listed above, or other percentages.

Figure 8:
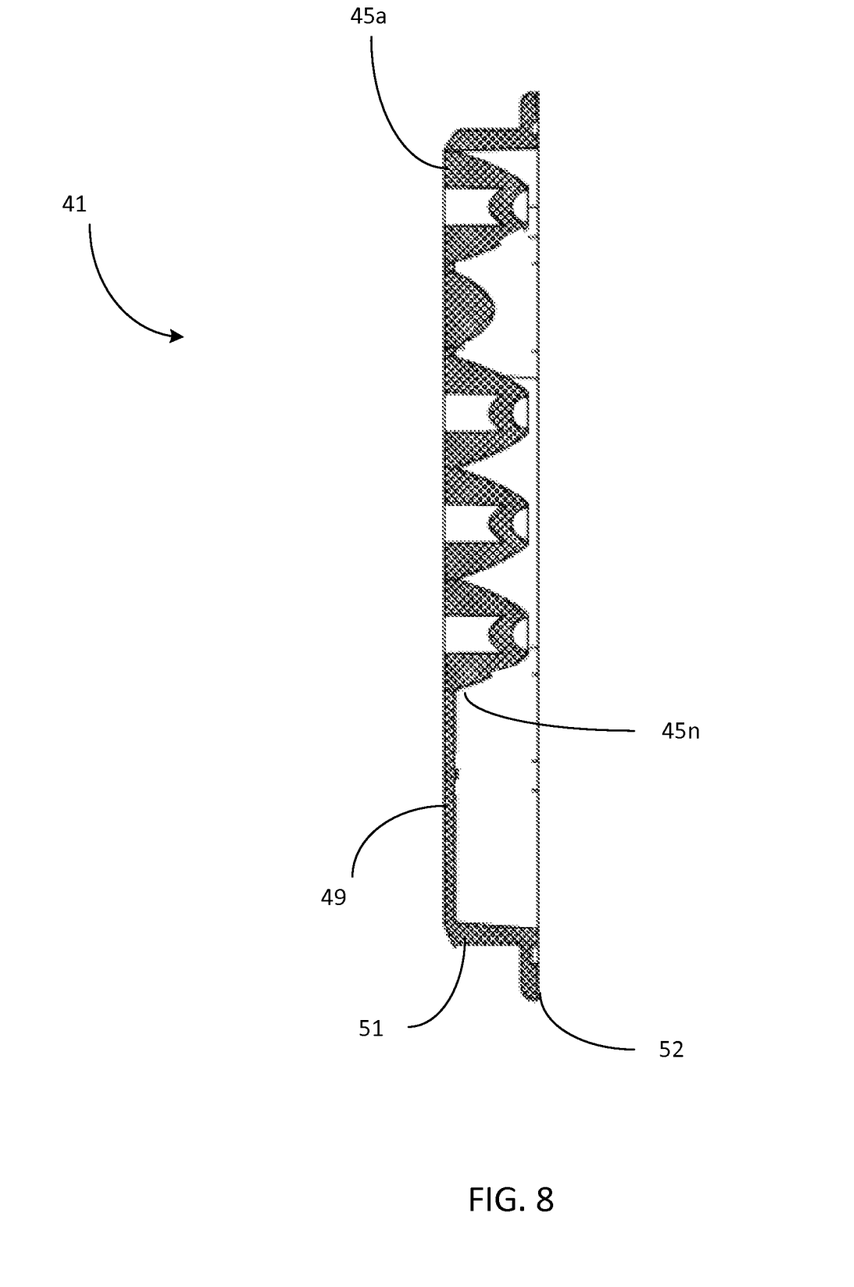
FIG. 8 illustrates several of the lens structures of FIG. 7 molded together to form a lens cover.

FIG. 8 is a side cross-sectional view showing how a group of the lenses of FIG. 7 may be molded into a lens cover 41 such as the one of FIG. 6A. In FIG. 8. A group of lenses 45a . . . 45n are connected by a connecting structure 49 that serves as a support that holds the lenses together. The connecting structure 49 may fill in all open areas between the lenses, or it may in the form of a web with a group of lateral supports that interconnect the lenses. The connecting structure 49 only needs to connect to an upper portion of each lens (such as the upper rim 78 of each lens as shown in FIG. 7), although it will also have one or more sidewalls 51 that extend down from the connecting structure and protect the LEDs under the cover from outside environmental conditions such as dust and rain, and optionally a lower rim 52 that is connected to a lower end of the sidewall to be received into the opening of the lighting device.

Figure 9:
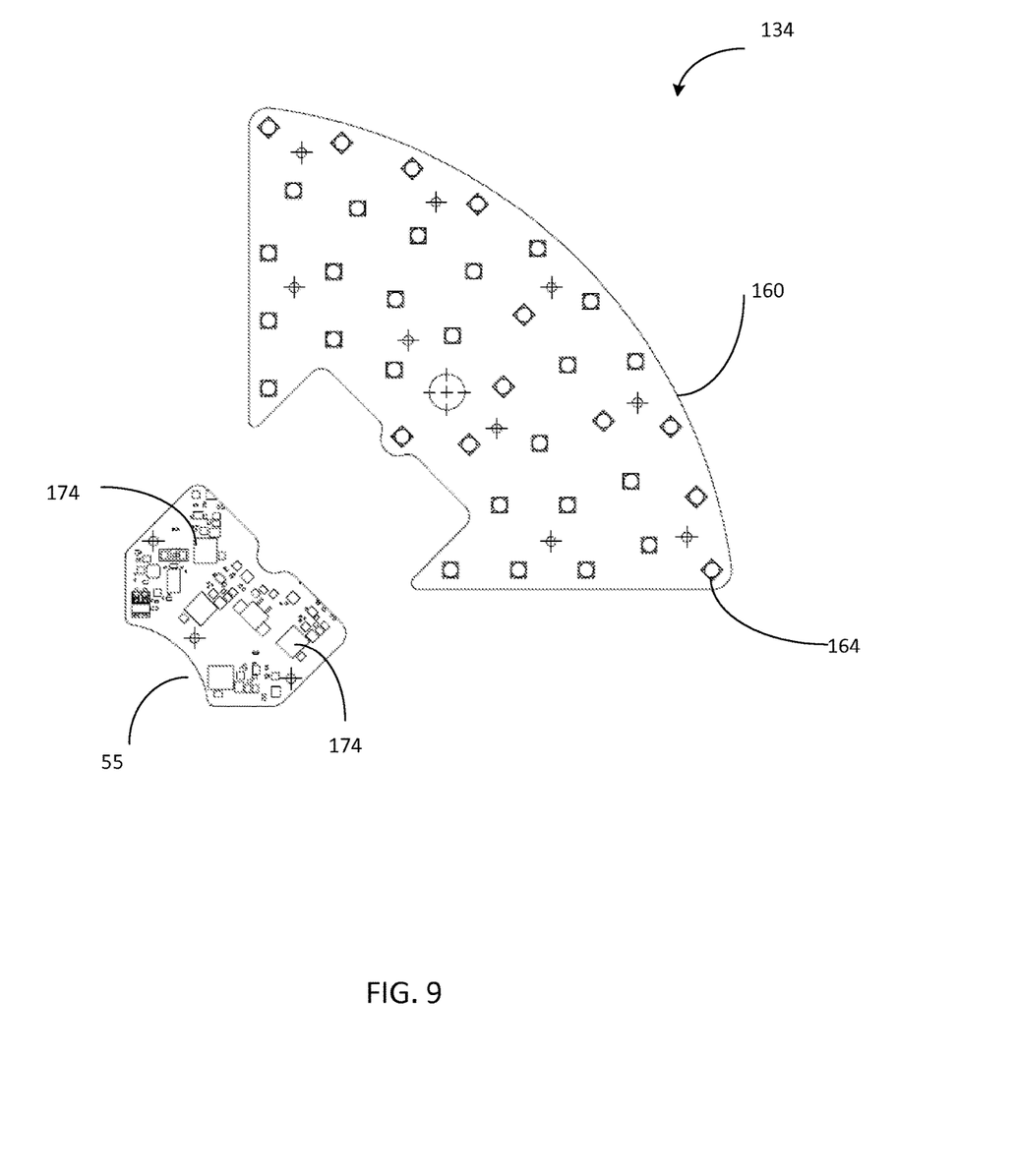
FIG. 9 illustrates an example of an LED array on a substrate, with a control card.

FIG. 9 illustrates an example of a portion of an LED module 134. The LED module includes any number of LEDs 164. The LEDs may be arranged in rows, matrices, or other arrangements with corresponding components supported in place and/or spaced apart to form modules of any number of LEDs. The LEDs may be arranged and mounted on a circuit board 160. Driver circuitry on the circuit board 160 may deliver current to the LEDs, and the LED array modules may include multi-wire connectors with prongs and/or receptacles for connecting to external conductors and/or signal wires, or other LED modules.

One or more circuit control cards 55 may be positioned under, adjacent to or otherwise near the LED modules to provide power to the LEDs. The LEDs to which power is supplied may be selectively controlled by control circuitry such as that described below in this document. The control card may include a supporting substrate made of a material such as fiberglass, and a non-transitory computable-readable memory for storing programming instructions and/or monitored data and/or operational history data, one or more processors, a field programmable gate array (FPGA), application specific integrated circuit (ASIC) or other integrated circuit structures, and a received for receiving control signals from an external transmitter. The LED module 134 and control card 55 may be placed within an opening of one end of the housing body.

The circuitry of the control card 55 and or the LED module 134 may operate to maintain a constant current draw across the LEDs and automatically adjust the intensity of the emitted light in response to feedback collected by the sensors. For example, each LED module 134 may be arranged so that groups of LEDs are electrically connected in series. Each group may be served by a programmable system on a chip (SoC) 174 which serves to receive a command from telemetry and send duty cycle information to multiple strings of LEDs.

It is intended that the portions of this disclosure describing LED modules and control systems and methods are not limited to the embodiment of the illumination devices disclosed in this document. The LED modules, control systems and control methods may be applied to other LED illumination structures, such as those disclosed in International Patent Application No. PCT/US2012/069442, filed Sep. 13, 2012 by Nolan et al., the disclosure of which is incorporated herein by reference in its entirety.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A light fixture comprising:
a light emitting diode (LED) structure comprising a plurality of LEDs that are connected to a supporting substrate;
a lens cover comprising a plurality of lenses, each positioned to be located over one of the LEDs, each lens comprising a collimator configured to provide a narrow beam from an LED under the lens, wherein the collimator comprises:
a first end positioned proximate the LED under the lens and an opposing second end having a width that is wider than a width of the first end;
an air gap positioned at the first end, wherein:
the air gap comprises an opening that is symmetrically positioned around a central axis, and,
the opening comprises a concave sidewall that extends into the collimator to form a dome shape; and
a core positioned to have a central axis that is positioned along the central axis of the air gap, wherein the core includes an open end positioned at the second end of the collimator and a closed end that:
is opposite the open end,
has a width that is substantially the same as a width of the open end, and
has a dome shape, wherein the apex of the dome extends into the core, wherein:
each LED has a width of X, and
a diameter of the second end is 4.2X to 4.4X.

2. The light fixture of claim 1, wherein the dome shape of the closed end of the core has a radius of curvature that is substantially the same as that of the concave sidewall of the air gap.

3. The light fixture of claim 1, wherein:
each collimator comprises a polycarbonate material that surrounds the core; and
each core is open to receive ambient air.

4. The light fixture of claim 1, wherein:
each collimator comprises a sidewall that provides a bowl shape; and
each core comprises a hollow cylinder.

5. The light fixture of claim 1, wherein the lens cover also comprises a connecting structure that connects to an upper portion of each lens and supports each lens.

6. The light fixture of claim 5, wherein the connecting structure also comprises:
a sidewall that extends from a support of the connecting structure; and
a lower rim that is connected to a lower end of the sidewall to be received into an opening of the light fixture.

7. The light fixture of claim 1, wherein:
the light fixture also comprises a circuit board that is connected to or part of the supporting substrate; and
the lens cover also comprises an area that does not include lenses and is configured to cover the circuit board.

8. The light fixture of claim 1, wherein:
a distance between the first end and the apex of the air gap is about 1.48X to about 1.54X;
a diameter of the core is about 1.48X to about 1.54X; and
a height of the core is about 2.15X to about 2.4X.

9. The light fixture of claim 1, wherein each lens is configured to provide a beam angle of about 10.3° and a field angle of about 18.2°.

10. A lens cover for a light emitting diode (LED) lighting fixture, the lens cover comprising:
a plurality of lenses, each lens comprising a collimator configured to provide a narrow beam from an LED, wherein the collimator comprises:
a first end positioned proximate the LED under the lens and an opposing second end having a width that is wider than a width of the first end;
an air gap positioned at the first end, wherein:
the air gap comprises an opening that is symmetrically positioned around a central axis, and the opening comprises a concave sidewall that extends into the collimator to form a dome shape; and a core positioned to have a central axis that is positioned along the central axis of the air gap, wherein the core includes an open end positioned at the second end of the collimator and a closed end that:
is opposite the open end,
has a width that is substantially the same as a width of the open end, and
has a dome shape, wherein the apex of the dome extends into the core, and wherein:
each LED has a width of X,
a diameter of the second end is 4.2X to 4.4X, and
each lens is configured to provide a beam angle of 10.3° and a field angle of 18.2°.

11. The lens cover of claim 10, wherein:
the dome shape of the closed end of the core has a radius of curvature that is substantially the same as that of the concave sidewall of the air gap.

12. The lens cover of claim 10, wherein:
each collimator comprises a polycarbonate material that surrounds the core;
each collimator comprises a sidewall that provides a bowl shape; and
each core comprises a hollow cylinder that is open to receive ambient air.

13. The lens cover of claim 10, wherein:
each collimator comprises a sidewall that provides a bowl shape; and
each core comprises a hollow cylinder.

14. The lens cover of claim 10, further comprising a connecting structure that connects to an upper portion of each lens and supports each lens.

15. The lens cover of claim 14, wherein the connecting structure also comprises:
a sidewall that extends from a support of the connecting structure; and a lower rim that is connected to a lower end of the sidewall and configured to be received by an LED lighting fixture.

16. The lens cover of claim 10, wherein the lens cover also comprises an area that does not include lenses and that is configured to cover a circuit board.

17. The light fixture of claim 1, wherein:
a distance between a first end and the apex of the air gap is about 1.48X to about 1.54X;
a diameter of the core is about 1.48X to about 1.54X; and
a height of the core is about 2.15X to about 2.4X.

18. A lens for a light emitting diode (LED), the lens comprising:
a collimator configured to provide a narrow beam from an LED, wherein the collimator comprises:
a first end positioned proximate the LED under the lens and an opposing second end having a width that is wider than a width of the first end;
an air gap positioned at the first end, wherein the air gap comprises an opening that is symmetrically positioned around a central axis, and
the opening comprises a concave sidewall that extends into the collimator to form a dome shape; and a core positioned to have a central axis that is positioned along the central axis of the air gap, wherein the core includes an open end positioned at the second end of the collimator and a closed end that is:
opposite the open end,
has a width that is substantially the same as a width of the open end, and
has a dome shape, wherein the apex of the dome extends into the core, and wherein:
each LED has a width of X,
a diameter of the second end is 4.2X to 4.4X, and
each lens is configured to provide a beam angle of 10.3° and a field angle of 18.2°.

* * * * *